July 16, 1957   C. F. BRIGNER, JR   2,799,079
CUTTING TOOLS
Filed April 29, 1955
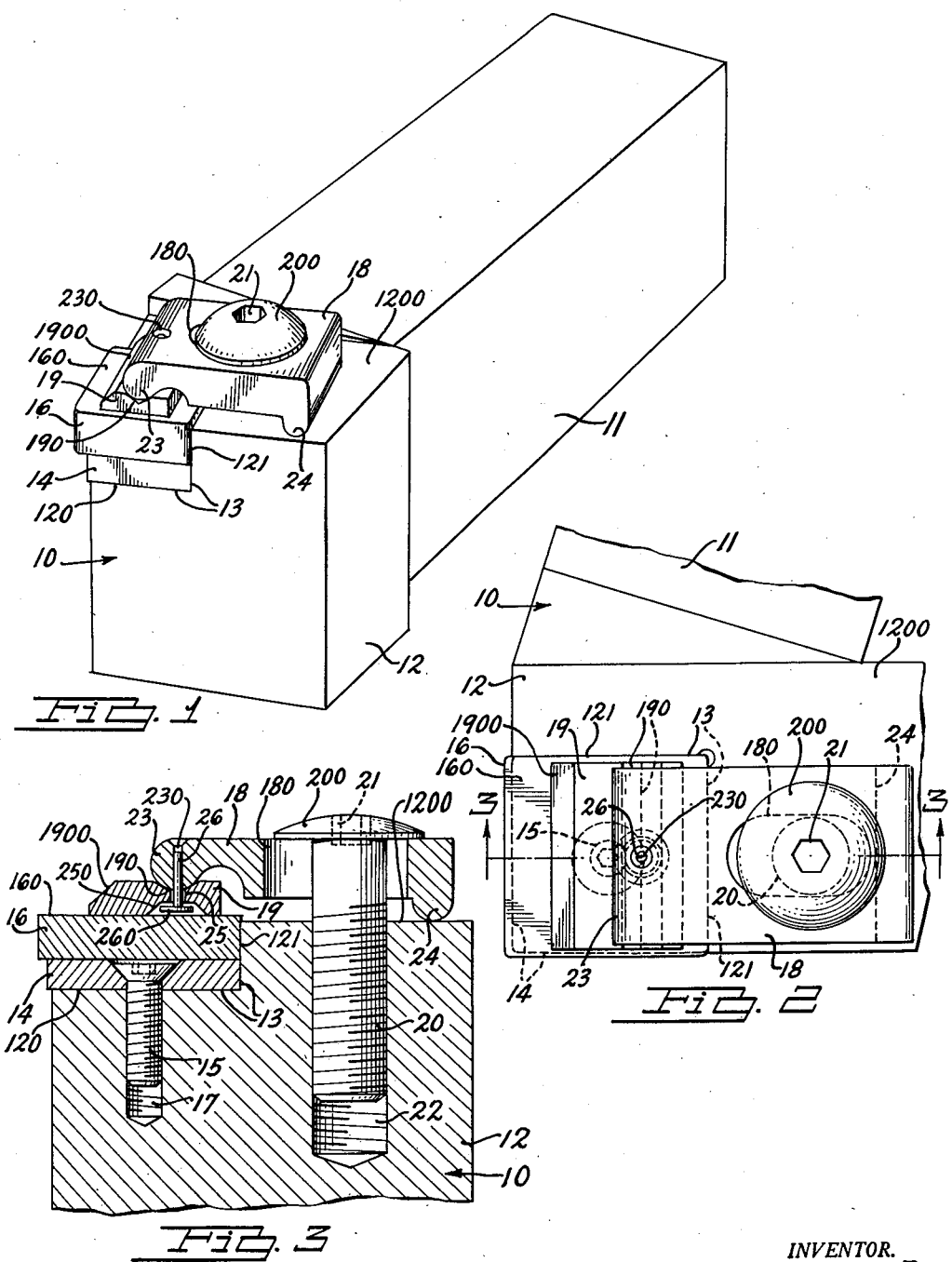
INVENTOR.
CHARLES F. BRIGNER, JR.
BY
ATTORNEY United States Patent Office 2,799,079
Patented July 16, 1957

2,799,079
CUTTING TOOLS

Charles F. Brigner, Jr., Southfield Township, Mich., assignor to Modern Corporation, Oak Park, Mich., a corporation of Michigan Application April 29, 1955, Serial No. 504,808

1 Claim. (Cl. 29—96)

This invention relates to cutting tools, and in particular to cutting tools of the type which employs replaceable carbide cutting elements.

In the prior art there are many and various types of cutting tool holders employing replaceable or throw-away cutting elements, some of which incorporate therewith a chip breaker element which is contacted by ribbons of metal being removed from the work to break the said ribbons into relatively small pieces or chips. The relative position of the chip breaker with respect to the cutting edge of the cutting element or tool bit must be adjusted according to the particular type of cut being taken from the work to assure effective chip breaking. At the same time, the cutting element or tool bit must be firmly and accurately held in the tool holder. The adjustment of the prior art chip breakers in respect to tool holders and the means employed to accomplish the clamping of chip breakers and tool bits firmly in the desired relationship in tool holders has not been completely satisfactory.

With the foregoing in view, one object of the invention is to provide a cutting tool including a tool holder, a cutting element and a chip breaker, and means carrying said chip breaker for clamping the cutting element in its proper position in the tool holder simultaneously with fixing the chip breaker in the desired position to which it may be adjusted in relation to the cutting tool, the said clamping means being formed to provide self-leveling of the chip breaker with respect to the cutting element to compensate for any inaccuracies that may occur in the thickness of the cutting element or the chip breaker.

Another object of the invention is to provide a tool holder including clamping means for securing a cutting element to said tool holder, the said clamping means carrying a chip breaker which is interposed between the cutting element and the chip breaker, the said chip breaker being readily adjusted in parallelism or in angular relationship to the cutting edge of the cutting element as the clamping means fixes the cutter to said tool holder.

A further object of the invention is to provide an improved cutting tool comprising a tool holder having a cutting element recess therein, a cutting element disposed in said recess, and clamping means including a chip breaker loosely pin connected thereto, and an anchorage stud for clamping the cutting element and chip breaker in its proper position in said tool holder, the said clamping means including a pair of spaced elongated fulcrums with a slotted aperture therethrough between said fulcrums through which said anchorage stud is disposed, one fulcrum bearing on a surface of the tool holder and the other fulcrum bearing on the chip breaker in a transverse groove formed in the top thereof, which organization of elements permits fine adjustment of the chip breaker with respect to the cutting element by first partially tightening the clamping means, sliding and/or turning the said clamping means and chip breaker to the desired position in respect to the cutting element, and then fully tightening the said clamping means whereupon all of the elements of the cutting tool become firmly fixed together to effect the equivalent of an integral unit.

Other objects of the invention will become apparent by reference to the following detailed description taken in connection with the accompanying drawing, in which:

Fig. 1 is a view in perspective showing a tool holder embodying the invention.

Fig. 2 is an enlarged fragmentary plan view of the tool holder disclosed in Fig. 1.

Fig. 3 is a fragmentary sectional view taken on the line 3—3 of Fig. 2.

Referring now to the drawing wherein like numerals refer to like and corresponding parts throughout the several views, the particular cutting tool 10 disclosed to illustrate the invention comprises a body 11 having a head 12 which is cut away or notched at 13 to accommodate an anvil 14 secured by a stud 15 to the seat 120 formed in the head 12 at the base of the said notch 13. The said stud 15 is threaded into a bore 17 in the head 12 just below the said notch 13 therein. Onto the anvil 14 is positioned a tungsten carbide or other suitable cutting element 16 preferably having its cutting edges extending outwardly from the outer edges of the anvil 14 and with two sides thereof positioned adjacent the angularly related walls 121 formed in the head 12 of the body 11 at the sides of the said notch 13. The cutting element 16 is preferably sufficiently thick so that the top 160 thereof is located slightly above the top 1200 of the head 12 of the body 11.

The cutting element 16 is securely clamped into the notch 13 against the anvil 14 by a clamping block 18 and a chip breaker 19 carried thereby. The clamping block 18 is provided with a slotted aperture 180 therethrough to accommodate a clamping stud 20 having a relatively large flat head 200 with an Allen wrench socket 21 therein. The said clamping stud 20 is threaded into a bore 22 in the head 12 of the body 11 located in spaced relationship to the notch 13 therein as best shown in Figs. 2 and 3. At opposite ends of the clamping block 18 are transversely disposed elongated fulcrums 23 and 24. The fulcrum 23 is seatable in a transverse groove 190 in the top of the chip breaker 19 while the fulcrum 24 is seatable on the top surface 1200 of the head 12 of the tool body 11. The chip breaker 19 is shown with a beveled front edge 1900, however, it is obvious that the chip breaker 19 may be of any suitable shape and detail to perform its combined function of breaking up ribbons of metal cut from work being cut by the cutting element 16 and anchoring the said cutting element 16 securely to the head 12 of the tool body 11 within the notch 13 therein.

The chip breaker 19 is provided with a vertical bore 25 therethrough located laterally central in respect to the base of the transverse groove 190 in the top thereof. A counterbore 250 is provided at the bottom of the bore 25 as best shown in Fig. 3. The elongated fulcrum 23 is provided with a laterally central vertical bore 230 to accommodate a headed pin 26 which is pressed thereunto after first having been telescoped through the bore 25 in the chip breaker 19, the head 260 of the pin 26 being disposed in the counterbore 250 at the bottom of the chip breaker 19. The bore 25 and counterbore 250 are sufficiently oversize in respect to the pin 26 and the head 260 thereof to permit limited free movement of the chip breaker 19 with respect to the elongated fulcrum 23 of the clamping block 18.

With the foregoing construction, the cutting element 16 is placed on the anvil 14 with two sides of the said cutting element disposed in contact with the angularly related walls 121 of the head 12 of the body 11. The clamping block 18 which carries the chip breaker 19 is positioned over the head 12, and the clamping stud 20 is telescoped through the slotted aperture 180 therein. With the said chip breaker 19 carried by the clamping block 18 suitably positioned over the cutting element 16, the clamping stud 20 is then turned so that the chip breaker 19 frictionally holds the cutting element 16 in place. The chip breaker 19 is then slid or swung or both until it is in the desired specific dimensional and angular relationship to the cutting element 16. The clamping stud 20 is then fully tightened whereupon the cutting element 16 is locked into the notch 13 of the head 12 so that the several elements of the cutting tool 10 are fixed together effectively as an integral whole.

This is possible because of the providing of the clamping block 18 with depending elongated fulcrums 23 and 24 spaced at opposite sides of the clamping stud 20, one of which fulcrums pivots on the top surface 120 of the head 12 while the other fulcrum pivots in the transverse groove 190 of the chip breaker 19, both fulcrums simultaneously accommodating themselves and the clamping block 18 to any irregularities in the thickness of the cutting element 16 and/or the chip breaker 19 in respect to the top surface 1200 of the tool body head 12.

When it is necessary to relocate the chip breaker 19 or to change the cutting element 16, there is only one loose piece to handle, namely, the cutting element 16, and, as a result, the chip breaker 19 is not lost or dropped into the chip chute or the oil pan of the lathe or other machine tool with which a cutting tool embodying the invention is employed.

Although but a single embodiment of the invention has been disclosed and described in detail, it is obvious that many changes may be made in the size, shape, arrangement and detail of the various elements of the invention without departing from the spirit and scope thereof as defined by the appended claim.

I claim:

In a cutting tool, in combination, a tool holder including a head having a notch therein forming a seat and angularly related walls, a cutting element positioned on said seat in abutment with said angularly related walls, a clamping block including spaced transverse rigid fulcrums and having a longitudinal slot therein between said fulcrums, one of said fulcrums being disposed over said cutting element and the other fulcrum over said tool holder head, a chip breaker having a transverse groove in the top thereof and a seat recessed in the bottom thereof centrally in respect to said groove, headed pin means having a flat head portion adjacent said chip breaker seat telescoped through said chip breaker centrally of said transverse groove therein and pressed into said one fulcrum loosely connecting said chip breaker to said one fulcrum and normally maintaining said chip breaker in self-centering spaced relationship with respect to said fulcrum while permitting only limited universal movement therebetween, and clamping stud means extending through said clamping block slot threaded into said tool holder clamping said chip breaker in an adjusted position and said cutting element in said notch in said tool holder, said chip breaker being normally suspended in non-turnable spaced relationship from said one fulcrum when said clamping stud is loosened to facilitate changing of said cutting element.

References Cited in the file of this patent

UNITED STATES PATENTS

| | | |
|---|---|---|
| 2,166,826 | Shepherd | July 18, 1939 |
| 2,381,485 | Chapman | Aug. 7, 1945 |
| 2,487,022 | La Placa | Nov. 1, 1949 |
| 2,619,010 | Mathison | Nov. 25, 1952 |

FOREIGN PATENTS

| | | |
|---|---|---|
| 989,307 | France | Sept. 7, 1951 |